United States Patent
Ojeda Olive

(10) Patent No.: US 10,774,974 B2
(45) Date of Patent: Sep. 15, 2020

(54) IN-SITU REBUILD METHOD FOR IN-SITU REBUILDING AND REPAIRING PIPES AND CONTAINMENT STRUCTURE

(71) Applicant: GRUPO NAVEC SERVICIOS INDUSTRIALES, S.L., La Pobla de Mafumet (ES)

(72) Inventor: Saturnino Ojeda Olive, Tarragona (ES)

( * ) Notice: Subject to any disclaimer, the term of this patent is extended or adjusted under 35 U.S.C. 154(b) by 52 days.

(21) Appl. No.: 16/121,208

(22) Filed: Sep. 4, 2018

(65) Prior Publication Data
US 2019/0072225 A1    Mar. 7, 2019

(30) Foreign Application Priority Data
Sep. 4, 2017  (EP) .................................... 17382593

(51) Int. Cl.
| | | |
|---|---|---|
| *F16L 55/168* | (2006.01) | |
| *B29C 73/10* | (2006.01) | |
| *B29C 73/32* | (2006.01) | |
| *F16L 55/18* | (2006.01) | |
| *B29C 70/86* | (2006.01) | |
| *F16L 55/163* | (2006.01) | |
| *B29C 70/44* | (2006.01) | |
| *B29L 23/00* | (2006.01) | |

(52) U.S. Cl.
CPC ........ *F16L 55/1683* (2013.01); *B29C 70/443* (2013.01); *B29C 70/86* (2013.01); *B29C 73/10* (2013.01); *B29C 73/32* (2013.01); *F16L 55/163* (2013.01); *F16L 55/18* (2013.01); *B29L 2023/22* (2013.01)

(58) Field of Classification Search
CPC . F16L 55/1683; F16L 55/1686; F16L 55/168; F16L 55/17; F16L 55/18; B29C 70/443; B29C 70/86; B29C 2043/3644; B29C 66/00145; B29C 66/81455; B29C 73/10; B29C 73/32; C09J 5/02; B32B 38/0012

USPC ................. 156/94, 95, 98, 285–287; 138/99
See application file for complete search history.

(56) References Cited

U.S. PATENT DOCUMENTS

| | | |
|---|---|---|
| 5,732,743 A | 3/1998 | Livesay |
| 5,972,141 A * | 10/1999 | Ellyin ...................... B23P 6/04 156/71 |
| 7,387,138 B2 * | 6/2008 | Rice .................... F16L 55/1686 138/97 |
| 9,579,873 B2 | 2/2017 | Hanks et al. |
| 2007/0145622 A1 * | 6/2007 | Cicci ..................... B29C 70/443 264/40.1 |
| 2013/0192742 A1 * | 8/2013 | Blackburn .......... B29C 35/0227 156/64 |
| 2016/0279865 A1 | 9/2016 | Souza et al. |

FOREIGN PATENT DOCUMENTS

| | | | |
|---|---|---|---|
| CN | 106393732 A | 2/2017 | |
| EP | 2540483 A1 * | 1/2013 | ......... B29C 66/1226 |
| WO | 2008129266 A1 | 9/1974 | |

* cited by examiner

*Primary Examiner* — John L Goff, II
(74) *Attorney, Agent, or Firm* — Eugenio J. Torres-Oyola; Victor M. Rodriguez-Reyes; Ferraiuoli LLC

(57) ABSTRACT

The in-situ rebuild method comprises roughening by a roughening technique a surrounding inner or outer surface to be treated around a defective section of a pipe or containment structure, applying one or more layers of a self-adhesive fiber sheet onto the roughened surface to be treated, encapsulating with a vacuum bag the one or more layers of the self-adhesive fiber sheet laying on the surface to be treated, creating by means of a vacuum system a low pressure into a space between the vacuum bag and the surface to be treated, injecting by means of an injection system an impregnation curable resin into the mentioned space, stopping the injecting and letting the impregnation curable resin to cure thereby forming a composite rebuild laminate on the surface to be treated surrounding the defective section, and disconnecting the vacuum system and the injection system and removing the vacuum bag.

9 Claims, No Drawings

IN-SITU REBUILD METHOD FOR IN-SITU REBUILDING AND REPAIRING PIPES AND CONTAINMENT STRUCTURE

TECHNICAL FIELD

Containment Structures

The present invention generally relates to an in-situ rebuild method and more particularly to a method for in-situ rebuilding and repairing pipes and containment structures by a resin vacuum infusion technique.

BACKGROUND ART

Facilities including outdoors or buried pipes and/or containment structures, such as tanks, reservoirs, containers, etc., are known. This includes pipes and/or containment structures made of metallic or non-metallic materials such as for example steels, concrete, fiber composites, plastics and wood. Such pipes and/or containment structures are intended to conduct or contain various fluids such as hydrocarbons, gases, water, etc., eventually under pressure, and often are exposed to aggressive environments.

With the use, this kind of pipes and/or containment structures become degraded or damaged until having one or more defective sections that need to be repaired or in many cases even must be replaced. In-situ repairing, for example by means of a patch, is only feasible if damages are concentrated in a relatively reduced area of the surface of the pipe and/or containment structure. Replacement of a whole defective section of the pipe and/or containment structure is expensive and the operation service needs to be interrupted for an undesirable long time.

A repair or manufacturing technique by using resin vacuum infusion is known, which comprises in summary applying one or more layers of a self-adhesive fiber sheet onto a surface to be treated, encapsulating with a vacuum bag the one or more layers of the self-adhesive fiber sheet applied onto the surface to be treated, creating by means of a vacuum system a low pressure into a space between the vacuum bag and the surface to be treated to compress the one or more layers of the self-adhesive fiber sheet, and injecting by means of an injection system a curable resin into the space between the vacuum bag and the surface to be treated where the low pressure has been created to impregnate the one or more layers of the self-adhesive fiber sheet with the curable resin. Then, the injection is stopped and the curable resin is let to cure thereby forming a composite laminate. Finally, the vacuum system and the injection system are disconnected and the vacuum bag removed.

Document U.S. Pat. No. 9,579,873 B2 discloses a method and an apparatus for reworking a damaged area of a structure, such as for example an aircraft skin, from one side of the structure using vacuum resin infusion of a dry fiber patch. Entrapped air and excess resin are removed from the patch during the infusion process by inserting a vacuum device into the patch, and forcing the area resin through the vacuum device.

Document CN 106393732 A discloses a yacht manufacturing method which involves paving reinforced fiber material on a yacht mold according to a structure layer, forming a vacuum auxiliary material on an upper surface of the reinforced fiber material in the yacht mold, fixing the auxiliary material with a diversion net and a guide pipe, and forming a vacuum bag film on the auxiliary material. Air pumping process is performed between the yacht mold and the vacuum bag by a vacuum pump which is connected with an exhaust pipe. Resin is injected into a vacuum mold cavity of the yacht mold and a yacht boat body is obtained by removing the yacht mold. The yacht mold is reusable.

DISCLOSURE OF THE INVENTION

The present invention provides an in-situ rebuild method for in-situ rebuilding and repairing a defective section of a pipe or containment structure by resin vacuum infusion using the defective section of the pipe or containment structure as a lost mold. In other words, the proposed method comprises building a new pipe or containment structure section made of a composite laminate over an inside or outside surface of the defective section of the pipe or containment structure.

Thus, the rebuilt pipe or containment structure can be put into operation service immediately after the resin used in the composite laminate has been cured, thereby achieving a result equivalent to the replacement of the defective section with reduced cost and a significantly shorter downtime.

The in-situ rebuild method of the present invention makes use of some of the teaching of the cited known resin vacuum infusion technique which comprises applying one or more layers of a self-adhesive fiber sheet onto a surface to be treated of the pipe or containment structure, encapsulating with a vacuum bag the one or more layers of the self-adhesive fiber sheet applied onto the surface to be treated, creating by means of a vacuum system a low pressure into a space between the vacuum bag and the surface to be treated to compress the one or more layers of the self-adhesive fiber sheet, and injecting by means of an injection system an impregnation curable resin into the space between the vacuum bag and the surface to be treated where the low pressure has been created to impregnate the one or more layers of the self-adhesive fiber sheet with the impregnation curable resin. Then, stopping the injecting and letting the impregnation curable resin to cure thereby forming a composite rebuild laminate, and finally disconnecting the vacuum system and the injection system and removing the vacuum bag.

The in-situ rebuild method of the present invention includes the following innovative features which contribute to enable an in-situ rebuilding and repairing of a defective section of a pipe (of greater or lesser length) or containment structure by the resin vacuum infusion technique.

The surface to be treated over which the one or more layers of the self-adhesive fiber sheet are applied is a surrounding inner or outer surface to be treated which completely surrounds a defective section of the pipe or containment structure, and the vacuum bag is a surrounding vacuum bag completely covering the surrounding inner or outer surface to be treated. With this arrangement, the whole defective section of the pipe or containment structure is rebuilt.

The surrounding inner or outer surface to be treated is roughened by a roughening technique previous to the step of applying the one or more layers of the self-adhesive fiber sheet in order to ensure a posterior effective adhesion of the composite rebuild laminate.

In one embodiment, the in-situ rebuild method comprises, as the mentioned roughening technique, first adhering a peelable fabric with an adhesive curable resin onto the surrounding inner or outer surface to be treated, with the peelable fabric completely surrounding the defective section of the pipe or containment structure, then letting the adhesive curable resin to cure, and finally stripping off the peelable fabric and the adhesive curable resin. With this, surface particles of the surrounding inner or outer surface to be treated are adhered to the adhesive curable resin and are stripped off together with the peelable fabric and the adhesive curable resin resulting in a roughen surrounding inner or outer surface to be treated.

Alternatively, another roughening technique can be used, such as manually scratching the surrounding inner or outer surface to be treated with a suitable tool, as for example a scrapper or a hand-held power tool.

Optionally, the in-situ rebuild method comprises the additional step of protecting the composite rebuild laminate with a protective coating compatible with intended work conditions and/or with the nature of an intended service fluid.

Preferably, the impregnation curable resin is injected by the injection system at a positive pressure. The low pressure provided by the vacuum system is moderated at an end phase of the step of injecting the impregnation curable resin and during curation of the impregnation curable resin.

The low pressure is applied by means of a vacuum pump and a plurality of exhaust tubes connected to a plurality of exhaust ports distributed throughout the surrounding vacuum bag, with the vacuum pump and the plurality of exhaust tubes belonging to the vacuum system. The vacuum bag is preferably tubular.

The impregnation curable resin is injected from a resin tank by means of an injection pump and a plurality of injection tubes connected to a plurality of injection ports distributed throughout the surrounding vacuum bag, with the resin tank, the injection pump and the plurality of injection tubes belonging to the injection system.

DETAILED DESCRIPTION OF AN EXEMPLARY EMBODIMENT

According to an exemplary embodiment, the in-situ rebuild method of the present invention comprises, first of all, roughening by a roughening technique a surrounding inner or outer surface to be treated surrounding a defective section of a pipe or containment structure in order to ensure posterior adhesion of a composite rebuild laminate to be formed thereon.

The roughening technique involves, for example, adhering a peelable fabric with an adhesive curable resin onto the surrounding inner or outer surface to be treated, with the peelable fabric surrounding the defective section of the pipe or containment structure, letting the adhesive curable resin to cure, and then stripping off the peelable fabric and the adhesive curable resin thereby roughening the surrounding inner or outer surface to be treated.

The peelable fabric can be, for example, a nylon woven fabric, and as the adhesive curable resin a high-density bicomponent resin can be used. For example, the high-density bicomponent resin is manually applied as the peelable fabric is adhered.

Afterwards, one or more layers of a self-adhesive fiber sheet are applied onto the roughened surrounding inner or outer surface to be treated. The self-adhesive fiber sheet is for example a commercially available non-woven sheet made of carbon fiber, glass fiber, or a combination thereof, impregnated with a permanent adhesive. The self-adhesive fiber sheet is supplied in rolls and as it is unrolled is adhered to the surrounding inner or outer surface to be treated by manually exerting pressure thereon, for example using a pressure roller.

Then, the one or more layers of the self-adhesive fiber sheet applied onto the surrounding inner or outer surface to be treated is encapsulated with a tubular surrounding vacuum bag. The surrounding vacuum bag is made of a plastic sheet rolled on the one or more layers of self-adhesive fiber sheet and sealed, for example, by means of an adhesive tape.

Once the surrounding vacuum bag is so arranged, a low pressure is created by means of a vacuum system into a space between the vacuum bag and the surrounding inner or outer surface to be treated to compress the one or more layers of the self-adhesive fiber sheet.

The vacuum system comprises a vacuum pump in communication with a grid of exhaust tubes connected to a plurality of exhaust ports distributed throughout the surrounding vacuum bag so the low pressure is applied by the vacuum pump through the exhaust tubes. Manually operable valves are preferably included in the exhaust tubes. An illustrative range of values for the low pressure created is, for example, from about 80,000 Pa (0.8 bar) to about 20,000 Pa (0.2 bar).

After the low pressure is created, an impregnation curable resin is injected by means of an injection system into the space between the surrounding vacuum bag and the surface to be treated where the low pressure has been created to impregnate the provided one or more layers of the self-adhesive fiber sheet with the impregnation curable resin.

The impregnation curable resin is preferably a bicomponent epoxy resin which can be manually prepared and temporarily stored in a resin tank. The injection system comprises an injection pump and a grid of injection tubes connected to a plurality of injection ports distributed throughout the surrounding vacuum bag. Manually operable valves are preferably included in the injection tubes.

The resin tank is located at a distance up to 200 meters from the vacuum bag and the impregnation curable resin is injected from the resin tank by the injection pump at a positive pressure of about 200,000 Pa (2 bar), for example.

When the one or more layers of the self-adhesive fiber sheet are impregnate with the impregnation curable resin injection is stopped and the impregnation curable resin is let to cure thereby forming a composite rebuild laminate.

According to an embodiment of the invention the low pressure provided by the vacuum system is moderated to a value from about 90,000 Pa (0.9 bar) to about 40,000 Pa (0.4 bar) at an end phase of the operation of injecting the impregnation curable resin and during curation of the impregnation curable resin. Moderating the low pressure is meant to make the low pressure closer to the atmospheric pressure, which is considered to be 100,000 Pa (1 bar) at normal conditions.

Once the composite rebuild laminate is formed on the defective section of the pipe or containment structure by curation of the impregnation curable resin impregnating the one or more layers of the self-adhesive fiber sheet, the vacuum system and the injection system are disconnected, the injection tubes and exhaust tubes are withdrawn and the surrounding vacuum bag is removed.

As an optional finishing step, the composite rebuild laminate is protected by laying thereon a protective coating in order to protect an external surface of the composite rebuild laminate against aggressive work conditions and/or against a corrosive or abrasive effect of an intended service fluid. For example, the protective coating can be an epoxy resin with a silica or quartz ceramic load and can be applied by spraying or painting.

The scope of the invention is defined by the appended claims.

What is claimed is:

1. An in-situ rebuild method for in-situ rebuilding and repairing pipes and containment structures by resin vacuum infusion, comprising the steps of:

applying one or more layers of a self-adhesive fiber sheet onto a surface to be treated of the pipe or containment structure, the surface to be treated being a surrounding inner or outer surface surrounding a defective section of the pipe or containment structure;

encapsulating with a vacuum bag said one or more layers of the self-adhesive fiber sheet applied onto said surface to be treated;

creating by a vacuum system a low pressure into a space between the vacuum bag and the surface to be treated to compress the one or more layers of the self-adhesive fiber sheet;

injecting by an injection system an impregnation curable resin into said space between the vacuum bag and the surface to be treated where the low pressure has been created to impregnate the one or more layers of the self-adhesive fiber sheet with said impregnation curable resin;

stopping the injecting and letting the impregnation curable resin to cure thereby forming a composite rebuild laminate; and disconnecting said vacuum system and said injection system and removing the vacuum bag, wherein the vacuum bag is a tubular surrounding vacuum bag covering said surrounding inner or outer surface to be treated; and the surrounding inner or outer surface to be treated is roughened by a roughening technique previous to said step of applying the one or more layers of the self-adhesive fiber sheet and wherein said roughening technique comprises the steps of:

adhering a peelable fabric with an adhesive curable resin onto said surrounding inner or outer surface to be treated, said peelable fabric surrounding said defective section of the pipe or containment structure;

letting said adhesive curable resin to cure; and stripping off said peelable fabric and the adhesive curable resin thereby roughening said surrounding inner or outer surface to be treated.

2. The in-situ rebuild method according to claim 1, further comprising an additional step of protecting said composite rebuild laminate with a protective coating compatible with intended work conditions and/or with an intended service fluid.

3. The in-situ rebuild method according to claim 2, wherein the impregnation curable resin is injected by the injection system at a positive pressure.

4. The in-situ rebuild method according to claim 1, wherein the impregnation curable resin is injected by the injection system at a positive pressure.

5. The in-situ rebuild method according to claim 4, wherein the low pressure provided by the vacuum system is moderated at least at an end phase of the step of injecting the impregnation curable resin and during curation of the impregnation curable resin.

6. The in-situ rebuild method according to claim 3, wherein the low pressure provided by the vacuum system is moderated at least at an end phase of the step of injecting the impregnation curable resin and during curation of the impregnation curable resin.

7. The in-situ rebuild method according to claim 1, wherein the low pressure is applied by means of a vacuum pump and a plurality of exhaust tubes connected to a plurality of exhaust ports distributed throughout the tubular surrounding vacuum bag, said vacuum pump and said plurality of exhaust tubes making part of the vacuum system.

8. The in-situ rebuild method according to claim 1, wherein the impregnation curable resin is injected from a resin tank by means of an injection pump and a plurality of injection tubes connected to a plurality of injection ports distributed throughout the tubular surrounding vacuum bag, said resin tank, said injection pump and said plurality of injection tubes making part of the injection system.

9. The in-situ rebuild method according to claim 1, wherein the low pressure provided by the vacuum system is moderated at least at an end phase of the step of injecting the impregnation curable resin and during curation of the impregnation curable resin.

* * * * *